United States Patent
Guthrie et al.

(10) Patent No.: US 7,514,016 B2
(45) Date of Patent: Apr. 7, 2009

(54) METHODOLOGY OF CHEMICAL MECHANICAL NANOGRINDING FOR ULTRA PRECISION FINISHING OF WORKPIECES

(75) Inventors: Hung-Chin Guthrie, Saratoga, CA (US); Ming Jiang, San Jose, CA (US)

(73) Assignee: Hitachi Global Storage Technologies Netherlands, BV, Amsterdam (NL)

( * ) Notice: Subject to any disclaimer, the term of this patent is extended or adjusted under 35 U.S.C. 154(b) by 375 days.

(21) Appl. No.: 10/903,833

(22) Filed: Jul. 30, 2004

(65) Prior Publication Data
US 2006/0021973 A1 Feb. 2, 2006
US 2006/0151436 A2 Jul. 13, 2006

(51) Int. Cl.
*B24B 1/00* (2006.01)
*H01L 21/00* (2006.01)

(52) U.S. Cl. .................. 216/88; 451/36; 451/5

(58) Field of Classification Search ............ 156/345.12; 216/38, 52, 88, 89, 90; 451/66, 36, 5
See application file for complete search history.

(56) References Cited

U.S. PATENT DOCUMENTS

| | | | |
|---|---|---|---|
| 4,837,923 A | 6/1989 | Brar et al. | |
| 5,722,156 A | 3/1998 | Balfrey et al. | |
| 5,749,769 A | 5/1998 | Church et al. | |
| 5,761,790 A | 6/1998 | Carr et al. | |
| 5,940,956 A | 8/1999 | Jordan | |
| 5,958,794 A * | 9/1999 | Bruxvoort et al. | 438/692 |
| 5,972,792 A * | 10/1999 | Hudson | 438/691 |
| 5,981,392 A * | 11/1999 | Oishi | 438/691 |
| 6,361,407 B1 * | 3/2002 | Lu et al. | 451/41 |
| 6,447,563 B1 * | 9/2002 | Mahulikar | 51/309 |
| 6,491,837 B1 * | 12/2002 | Liu et al. | 216/89 |
| 6,556,381 B2 * | 4/2003 | Kohira et al. | 360/236.3 |
| 6,569,349 B1 * | 5/2003 | Wang et al. | 252/79.1 |
| 6,793,559 B2 * | 9/2004 | Fang et al. | 451/41 |
| 6,796,883 B1 * | 9/2004 | Molnar | 451/41 |
| 6,872,123 B2 * | 3/2005 | Sudo et al. | 451/10 |
| 6,881,124 B2 * | 4/2005 | Takahashi et al. | 451/5 |
| 6,935,013 B1 * | 8/2005 | Markevitch et al. | 29/603.12 |
| 2002/0081943 A1 * | 6/2002 | Hendron et al. | 451/8 |
| 2003/0171075 A1 * | 9/2003 | Nihonmatsu et al. | 451/41 |
| 2004/0001285 A1 | 1/2004 | Tanaka et al. | |
| 2004/0021024 A1 * | 2/2004 | Yoshimura et al. | 242/348 |
| 2006/0115686 A1 * | 6/2006 | Ataka et al. | 428/831 |

FOREIGN PATENT DOCUMENTS

| | | |
|---|---|---|
| JP | 9180389 | 7/1997 |
| JP | 2002103204 | 4/2002 |
| JP | 2002205261 | 7/2002 |

* cited by examiner

*Primary Examiner*—Sylvia R. MacArthur
(74) *Attorney, Agent, or Firm*—Bracewell & Giuliani LLP

(57) ABSTRACT

A chemical-mechanical nanogrinding process achieves near-zero pole tip recession (PTR) to minimize magnetic space loss of the head transducer to media spacing loss, alumina recession and trailing edge profile variation, and smooth surface finish with minimal smearing across multi-layers of thin films and the hard substrate to meet the requirements of high areal density thin film magnetic heads for hard disk drives (HDD). With a fine chemical mechanical nanogrinding process, PTR can be improved to a mean of about 0.5 nm.

9 Claims, 3 Drawing Sheets

METHODOLOGY OF CHEMICAL MECHANICAL NANOGRINDING FOR ULTRA PRECISION FINISHING OF WORKPIECES

BACKGROUND OF THE INVENTION

1. Technical Field

The present invention relates in general to an improved ultrafine finish for workpieces having various elements with different hardnesses and, in particular, to an improved system, method, and apparatus for nanogrinding and chemical mechanical nanogrinding of workpieces with both chemical and mechanical processes.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

SUMMARY OF THE INVENTION

A typical HDD uses an actuator assembly to move magnetic read/write heads to the desired location on the rotating disk so as to write information to or read data from that location. The magnetic read/write devices are mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The motor used to rotate the disk is typically a brushless DC motor. The disk is mounted and clamped to a hub of the motor. The hub provides a disk mounting surface and a means to attach an additional part or parts to clamp the disk to the hub. In most typical motor configurations of HDDs, the rotating part of the motor (the rotor) is attached to or is an integral part of the hub. The rotor includes a ring-shaped magnet with alternating north/south poles arranged radially and a ferrous metal backing. The magnet interacts with the motor's stator by means of magnetic forces. Magnetic fields and resulting magnetic forces are induced via the electric current in the coiled wire of the motor stator. The ferrous metal backing of the rotor acts as a magnetic return path. For smooth and proper operation of the motor, the rotor magnet magnetic pole pattern should not be substantially altered after it is magnetically charged during the motor's manufacturing process.

As mentioned above the read/write head comprises an electromagnetic coil writer, a GMR or TMR reader, and a slider body. It flies over the magnetic disk to perform the read and write functions. To achieve optimum performance, the spacing between the transducer and the disk, called the magnetic space 19 (FIG. 1), must be consistently maintained and has become consistently smaller over time with the increasing of recording areal density. The magnetic space 19 is defined as the fly height 21 plus the pole tip recession (PTR) 11.

The PTR 11 has been a major contributor to the magnetic space loss for high areal density products. As shown in FIG. 1, the PTR is the height difference between the pole tips 13 and a plane 15 fitted to the ABS 17. It is caused by the differences in the removal rates of metal poles, alumina, and AlTiC in the slider abrasive finishing process. The slider abrasive finishing process critically affects the magnetic, electrical, and mechanical performances, as well as the stability of the recording heads. Therefore, ultraprecision abrasive finishing is a key technology in the final finishing of thin film magnetic recording heads.

SUMMARY OF THE INVENTION

One embodiment of a system, method, and apparatus for nanogrinding and chemical-mechanical nanogrinding is disclosed. The present invention achieves near-zero pole tip recession (PTR) to minimize magnetic space loss of the head transducer to media spacing loss, alumina recession (AluR)/ and trailing edge profile variation, and smooth surface finish (sub-nm Ra) and minimal smearing across multi-layers of thin films and the hard substrate to meet the requirements of high areal density thin film magnetic head for hard disk drive (HDD).

Lapping is a material removal process for the production of flat surfaces by free-abrasive three-body abrasion. A loose abrasive and a hard lapping plate are used for this purpose. During lapping, besides three-body abrasive abrasion (i.e., rolling), some abrasives also temporarily embed in the lapping plate to cause some temporal two-body abrasion. High material removal rate can be achieved by free-abrasive lapping.

Nanogrinding is a fixed abrasive two-body abrasion process that uses fixed-abrasive embedded in a soft plate as a finishing process for producing flat and good surface finish. The material removal rate from fixed-abrasive nanogrinding is lower than from free-abrasive lapping, but it can produce superior surface planarity (e.g., less recession). The recording heads are finished by free-abrasive lapping followed by nanogrinding. High material removal is achieved by free-abrasive lapping, and good surface finish and planarity are obtained by nanogrinding. Appropriate chemical-mechanical interactions in nanogrinding, called chemical-mechanical nanogrinding, result in further improvements in achieving good surface finish and planarization.

The planarity and surface finish from nanogrinding are superior to those from free-abrasive lapping. The PTR can be improved to about 8 nm by nanogrinding process versus about 30 nm by free-abrasive lapping process. With a fine chemical mechanical nanogrinding process, PTR can be improved to a mean of about less than 1.0 nm. In addition, nanogrinding is virtually scratch-free in contrast to the significant scratching of free-abrasive lapping.

Process integration and throughput issues are considered for free-abrasive and fixed-abrasive processes. Free-abrasive lapping process is recommended for high material removal rates followed by the fixed-abrasive nanogrinding process for achieving excellent finish. Further planarity and surface finish improvements are achieved by adjusting mechanical and chemical interaction in fixed-abrasive nanogrinding and chemical-mechanical nanogrinding.

A metal plate (e.g., zinc lapping plate) may be used for free-abrasive rough lapping, and a tin lapping plate is used for nanogrinding. Monocrystalline diamond slurry is used for high material removal free-abrasive lapping, and polycrystalline diamond slurry for nanogrinding. The polycrystalline diamond abrasive in ethylene glycol is dispensed on the plate surface and then the diamond abrasive is embedded or charged onto the lapping plate with a ceramic conditioning ring to form the nanogrinding plate.

The reactive solution plays an important role in chemical-mechanical nanogrinding. The chemistry of the reactive solution facilitates selective removal of the ceramic layers, namely, AlTiC and $Al_2O_3$ to metal, namely, NiFe and, hence, compensate for the preferential mechanical removal of the softer metal over the harder ceramic. The specific choice of the solution (e.g., viscosity, suspension, surfactant) and its chemical interaction (e.g., oxidizer, corrosion inhibitor, pH, and complex chelating agent) with the work material help achieve good surface and subsurface integrity, machining accuracy (e.g., less PTR), high material removal, final cleaning (e.g., rinseability), and abrasive and plate life.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
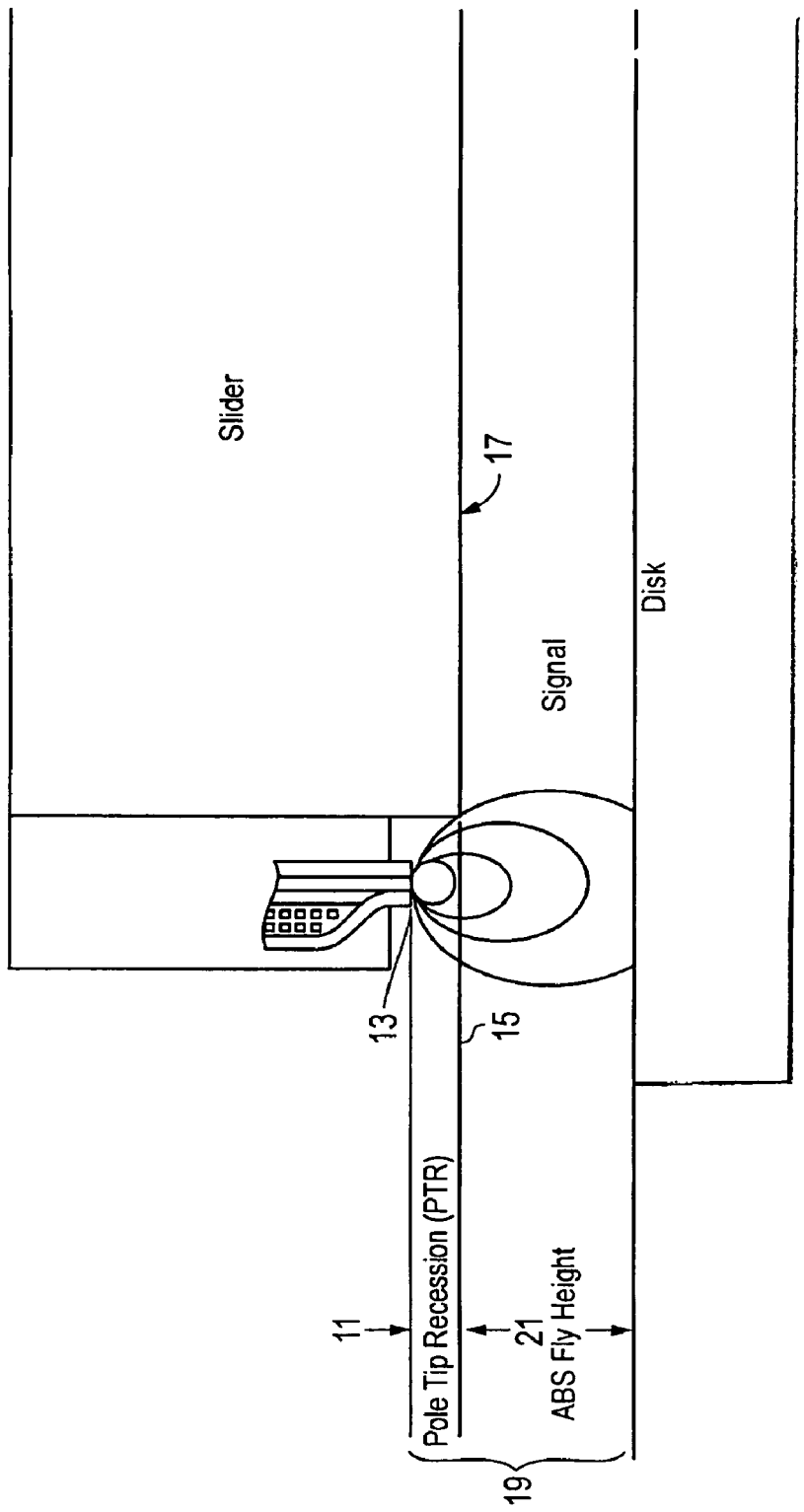
FIG. 1 is a schematic side view of a conventional slider flying over a surface of a disk media.
Figure 2:
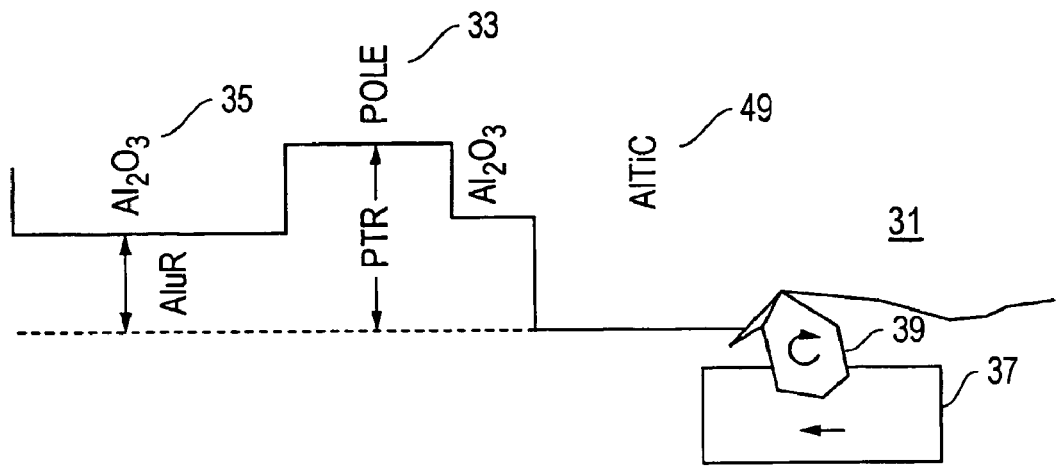
FIGS. 2 and 3 are sectional side views of the topography results of free-abrasive lap and nanogrinding, respectively.
Figure 3:
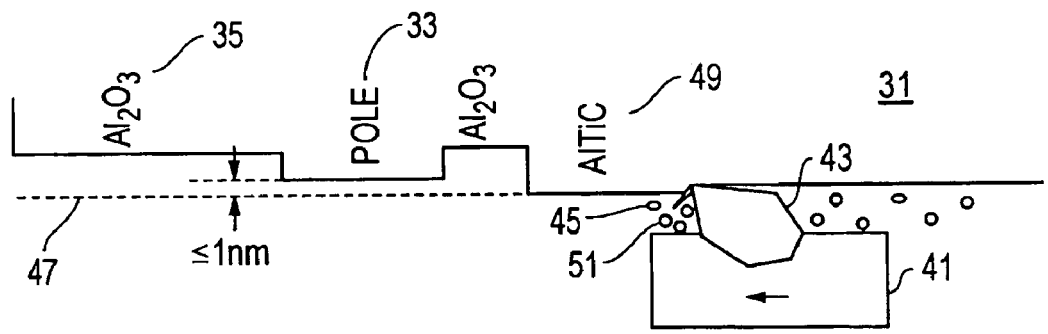
Figure 4:
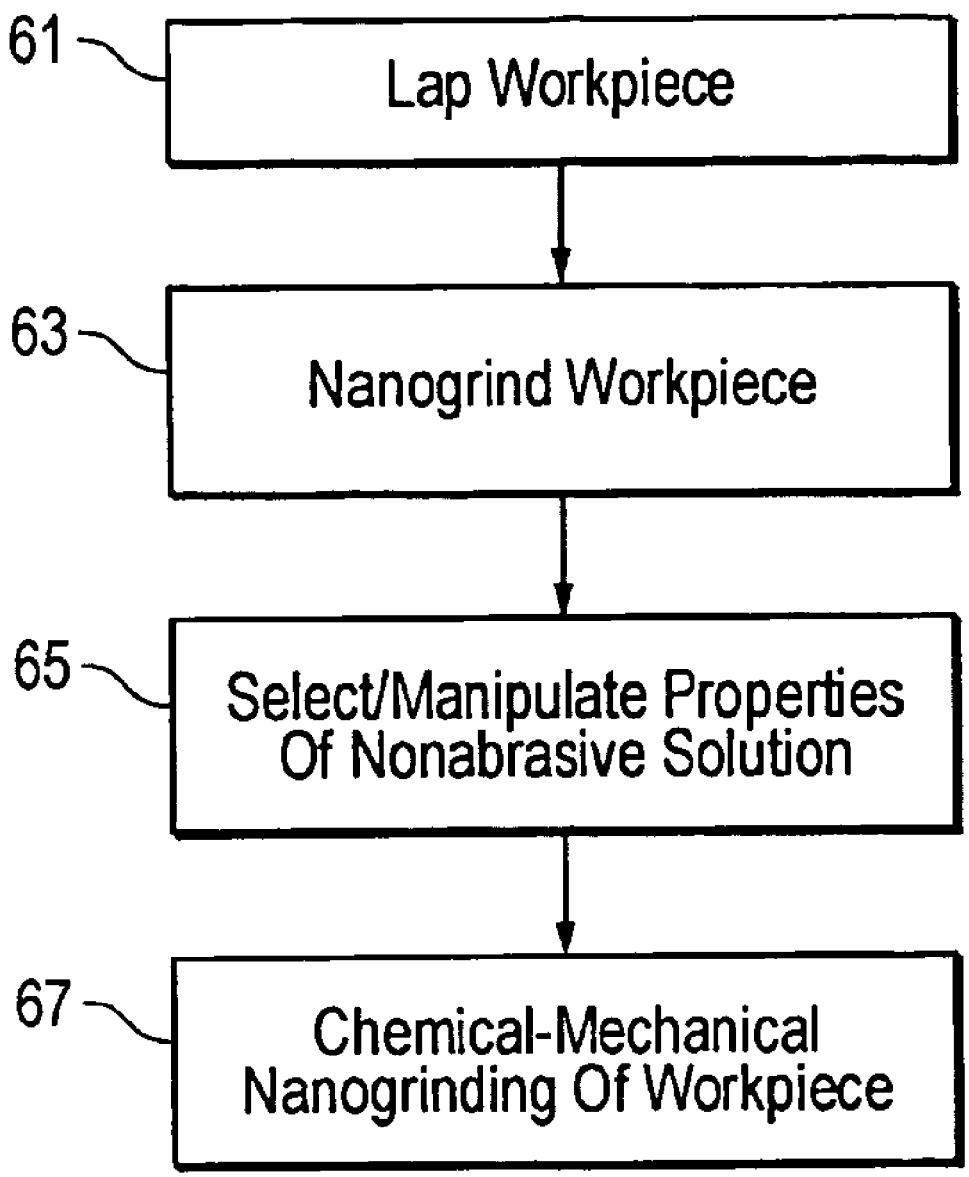
FIG. 4 is a high level flowchart depicted one embodiment of a method constructed in accordance with the present invention.

Referring to FIGS. 2-4, one embodiment of the present invention comprises a system, apparatus, and method of treating a surface of a workpiece 31 in order to improve a surface finish thereof. The workpiece 31 may comprise many different objects, but is well suited for a hard disk drive slider that is formed from a variety of different materials, such as metallic and ceramic materials.

One embodiment of a method of the present invention first comprises providing a workpiece 31 having a first material 33 (e.g., pole material) and a second material 35 (e.g., $Al_2O_3$) that differs from the first material 33. As depicted at block 61 (FIG. 4), the method further comprises lapping the workpiece 31 with a lapping substrate 37 and an abrasive slurry 39 between the workpiece 31 and the lapping substrate 37 such that portions of the first material 33 and the second material 35 are mechanically removed from the workpiece 31.

The method additional comprises nanogrinding the workpiece 31 with a nanogrinding substrate 41 and a nonabrasive solution 45, the nanogrinding substrate 41 having an abrasive 43 embedded in a surface thereof that mechanically removes additional portions of the first material 33 and the second material 35 from the workpiece 31, as illustrated at block 63. In addition, the method comprises selectively chemical mechanical removing (block 67) an additional portion of the second material 35 from the workpiece 31 with the nonabrasive solution 45. In one embodiment, both the mechanical and the chemical removal of material occur simultaneously to provide a very efficient and effective process.

The workpiece 31 defines a plane 47 (FIG. 3), and both the first and second materials 33, are removed from the workpiece 31 to within about one nanometer of the plane 47, and a surface roughness of approximately 0.5 nm rms. In one embodiment, nanogrinding removes more of the first material 33 than the second material 35, and the chemical removal step removes more of the second material 35 than the first material 33.

The method optionally further comprises providing the workpiece 31 with a third material 49 (such as AlTiC), and the chemical removal step comprises adding a nonabrasive substance 51 to the nonabrasive solution 45 for selectively chemically mechanical removing a portion of the third material 49 from the workpiece 31. The method also optionally comprises providing the nonabrasive solution 45 with desired properties (block 65) selected for viscosity, suspension, surfactant, and chemical interaction with the workpiece, including oxidizer, corrosion inhibitor, pH, complex chelating agent, and a selected conductivity that avoids corrosion of the workpiece 31 and reduces electrostatic discharge.

The nonabrasive solution 45 may include a water-soluble hydrocarbon chain of a hydroxyl (OH) group ethylene glycol solution, and may further comprise colloidal silica solution of having an average size of approximately 10 nm. Furthermore, the pH of the nonabrasive solution may be adjusted with organic additives, and the viscosity of the nonabrasive solution may be altered (e.g., increased) by partially replacing ethylene glycol with diethylene glycol, triethylene glycol, or propylene glycol and dipropylene glycol. The method may further comprise adding a corrosion inhibitor, such as BTA, Triton, Standapol, or Texapon, for example.

The slider abrasive finishing process critically affects the magnetic, electrical, and mechanical performance of the recording heads. Therefore, ultraprecision abrasive finishing is a key technology for final finishing of the thin film magnetic recording heads. The reactive solution plays an important role in chemical-mechanical nanogrinding. The chemistry of the reactive solution can facilitate selective removal of the ceramic layers, such as AlTiC and $Al_2O_3$ to metal, e.g., NiFe, and hence compensate for the preferential mechanical removal of the softer metal over the harder ceramic.

The specific choice of the solution (viscosity, suspension, surfactant) and its chemical interaction (oxidizer, corrosion inhibitor, pH, and complex chelating agent) with the workpiece or work material are critical in achieving good surface and subsurface integrity, machining accuracy (less PTR), high material removal, final cleaning (rinseability), and abrasive and plate life. Proper conductivity of the reactive solution is also required, e.g., low conductivity to avoid GMR/TMR stack corrosion but some conductivity to eliminate ESD damage issue during lapping and nanogrinding.

The pH of reactive solutions for chemical-mechanical nanogrinding may be adjusted by organic additives. PTR generally decreases with increasing pH and is smallest around pH 10. However, if the pH level becomes too high (e.g., pH 11), it may contribute to sensor corrosion, especially for copper layer in sensors.

Viscosity may be increased by partially replacing ethylene glycol ($C_2H_6O_2$) with either diethylene glycol, triethylene glycol, or propylene glycol and dipropylene glycol (viscosity increasing). The viscosity of an oil-soluble solution (e.g. petroleum-base) is lower than the water-soluble solution (e.g. ethylene glycol). Corrosion inhibitors such as BTA, Triton, Standapol, or Texapon may be used.

There are also oil-soluble nanogrinding solutions. By adding carboxyl (COOH) polar functional groups, such as $C_{17}H_{31}COOH$, $C_{17}H_{33}COOH$, and $C_{17}H_{33}COOH$ to oil-soluble lapping/nanogrinding solutions, such as petroleum, can achieve better metal surface finish.

The planarity and surface finish from nanogrinding are found to be much better than those from free-abrasive lapping. The planarity and surface finish improvement can be achieved by adjusting mechanical and chemical interaction in chemical mechanical nanogrinding. PTR can be improved to a mean of about 0.5 nm. The surface roughness of AlTiC/NiFe/$Al_2O_3$ improves to about 0.5 nm rms. Process integration and throughput issues are considered for free- and fixed-abrasive processes. Free-abrasive process is recommended for high material removal rate followed by chemical-mechanical nanogrinding for achieving excellent finish.

The present invention has several advantages, including the ability to achieve near-zero PTR. A high material removal is achieved by free-abrasive lapping, and good surface finish and planarity are obtained by fixed-abrasive nanogrinding. Chemical-mechanical interactions in chemical mechanical nanogrinding result in further improvements in achieving good surface finish and planarization.

The planarity and surface finish from fixed-abrasive nanogrinding are superior to those from free-abrasive lapping. In addition, fixed-abrasive nanogrinding is virtually scratch-free in contrast to the significant scratching of free-abrasive lapping. Further planarity and surface finish improvements are achieved by adjusting mechanical and chemical chemical-mechanical nanogrinding. The chemistry of the reactive solution facilitates selective removal of the ceramic layers and compensate for the preferential mechanical removal of the softer metal over the harder ceramic. The solution and its chemical interaction with the work material help achieve good surface and subsurface integrity, machining accuracy, high material removal, final cleaning, and abrasive and plate life.

While the invention has been shown or described in only some of its forms, it should be apparent to those skilled in the art that it is not so limited, but is susceptible to various changes without departing from the scope of the invention.

What is claimed is:

1. A method of finishing a surface of a slider for a hard disk drive, comprising:
   (a) providing a slider having a metal and a ceramic that differs from the metal;
   (b) lapping the slider with a lapping substrate and an abrasive slurry having a free abrasive between the slider and the lapping substrate such that portions of the metal and the ceramic are mechanically removed from the slider;
   (c) nanogrinding the slider with a nanogrinding substrate having a fixed abrasive and a nonabrasive chemical solution having no free abrasive, the nanogrinding substrate having an abrasive embedded in a surface thereof that mechanically removes additional portions of the metal and the ceramic from the slider without a free abrasive; and
   (d) selectively chemical mechanical removing an additional portion of the ceramic from the slider with the nonabrasive chemical solution by dissolving the additional portion of the ceramic, such that the slider defines a plane, both the metal and ceramic are removed from the slider to within about one nanometer of the plane, and the plane has a surface roughness of approximately 0.5 nm rms.

2. The method of claim 1, further comprising providing the slider with another material, and step (d) comprises adding a nonabrasive substance to the nonabrasive chemical solution for selectively chemical mechanical removing a portion of said another material from the slider.

3. The method of claim 1, wherein step (d) comprises providing the nonabrasive chemical solution with desired properties selected from the group consisting of: viscosity, suspension, surfactant, and chemical interaction with the slider, including oxidizer, corrosion inhibitor, pH, complex chelating agent, and a selected conductivity that avoids corrosion of the slider and reduces electrostatic discharge.

4. The method of claim 1, wherein the nonabrasive chemical solution includes a water-soluble hydrocarbon chain of a hydroxyl (OH) group ethylene glycol solution.

5. The method of claim 4, further comprising increasing viscosity of the nonabrasive chemical solution by partially replacing ethylene glycol with one of i. diethylene glycol, ii. triethylene glycol, and iii. propylene glycol and dipropylene glycol.

6. The method of claim 1, further comprising adjusting pH of the nonabrasive chemical solution with organic additives.

7. The method of claim 1, further comprising adding a corrosion inhibitor.

8. The method of claim 1, wherein step (c) comprises removing more of the metal than the ceramic, and step (d) comprises removing more of the ceramic than the metal.

9. The method of claim 1, wherein steps (c) and (d) occur simultaneously.

* * * * *